(12) United States Patent
Grasreiner

(10) Patent No.: US 11,614,044 B2
(45) Date of Patent: Mar. 28, 2023

(54) METHOD FOR COMPUTER-ASSISTED DETERMINATION OF MULTIPLE ROTATIONAL IRREGULARITIES IN AN INTERNAL COMBUSTION ENGINE

(71) Applicant: Bayerische Motoren Werke Aktiengesellschaft, Munich (DE)

(72) Inventor: Sebastian Grasreiner, Graefelfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/286,958

(22) PCT Filed: Nov. 20, 2019

(86) PCT No.: PCT/EP2019/081941
§ 371 (c)(1),
(2) Date: Apr. 20, 2021

(87) PCT Pub. No.: WO2020/114775
PCT Pub. Date: Jun. 11, 2020

(65) Prior Publication Data
US 2021/0388789 A1   Dec. 16, 2021

(30) Foreign Application Priority Data
Dec. 7, 2018 (DE) ...................... 10 2018 131 252.0

(51) Int. Cl.
*F02D 41/14* (2006.01)
*F02D 41/00* (2006.01)
*F02D 41/22* (2006.01)

(52) U.S. Cl.
CPC ..... *F02D 41/1498* (2013.01); *F02D 41/0097* (2013.01); *F02D 41/22* (2013.01); *F02D 2200/101* (2013.01)

(58) Field of Classification Search
CPC .. F02D 41/1498; F02D 41/0097; F02D 41/22; F02D 2200/101
See application file for complete search history.

(56) References Cited

U.S. PATENT DOCUMENTS

| 5,231,869 A | 8/1993 | Klenk et al. |
| 5,263,365 A | 11/1993 | Mueller et al. |
| (Continued) | | |

FOREIGN PATENT DOCUMENTS

| DE | 41 00 527 A1 | 7/1992 |
| DE | 41 18 580 A1 | 12/1992 |
| (Continued) | | |

OTHER PUBLICATIONS

International Search Report (PCT/ISA/210) issued in PCT Application No. PCT/EP2019/081941 dated Feb. 13, 2020 with English translation (four (4) pages).

(Continued)

*Primary Examiner* — Kurt Philip Liethen
(74) *Attorney, Agent, or Firm* — Crowell & Moring LLP

(57) ABSTRACT

Multiple rotational irregularities in an internal combustion engine are determined. An uneven running value of a currently-ignited combustion chamber in a logical ignition sequence of a plurality of combustion chambers immediately after a logically-preceding ignited combustion chamber is determined. The uneven running value determined for the logically-preceding ignited combustion chamber exceeds a specified threshold value and indicates a fault in the logically-preceding ignited combustion chamber. A compensation factor is determined that. A compensated uneven running value of the currently-ignited combustion chamber from the uneven running value of the currently-ignited combustion chamber and the compensation factor is determined. The compensated uneven running value of the currently-ignited combustion chamber is compared with the (Continued)

specified threshold value to determine whether the currently-ignited combustion chamber has a fault.

5 Claims, 2 Drawing Sheets

(56) References Cited

U.S. PATENT DOCUMENTS

| | | | |
|---|---|---|---|
| 5,433,107 A | 7/1995 | Angermaier et al. | |
| 5,505,087 A | 4/1996 | Angermaier et al. | |
| 5,747,679 A | 5/1998 | Dietz et al. | |
| 5,906,651 A | 5/1999 | Amano | |
| 6,062,071 A | 5/2000 | Henn et al. | |
| 7,073,485 B2* | 7/2006 | Truscott | F02D 37/02 |
| | | | 123/406.41 |
| 7,500,470 B2* | 3/2009 | Buslepp | F02D 41/1498 |
| | | | 123/436 |
| 7,823,563 B2* | 11/2010 | Jankovic | F02D 13/0226 |
| | | | 123/436 |
| 2002/0066445 A1* | 6/2002 | Thomas | F02D 41/22 |
| | | | 123/679 |
| 2009/0326787 A1* | 12/2009 | Hofmeister | F02D 41/0085 |
| | | | 701/104 |
| 2013/0118243 A1* | 5/2013 | Jessen | F02D 41/0085 |
| | | | 73/114.45 |
| 2014/0299096 A1* | 10/2014 | Rupp | F02D 41/008 |
| | | | 123/344 |
| 2018/0038319 A1* | 2/2018 | Hakeem | F02M 25/028 |

FOREIGN PATENT DOCUMENTS

| | | |
|---|---|---|
| DE | 196 32 903 A1 | 3/1997 |
| DE | 10 2012 203 559 A1 | 9/2013 |
| EP | 0 622 542 A1 | 11/1994 |
| EP | 0 576 705 B1 | 3/1996 |

OTHER PUBLICATIONS

German-language Written Opinion (PCT/ISA/237) issued in PCT Application No. PCT/EP2019/081941 dated Feb. 13, 2020 (seven (7) pages).

German-language Search Report issued in German Application No. 10 2018 131 252.0 dated Jan. 15, 2019 with partial English translation (15 pages).

* cited by examiner

METHOD FOR COMPUTER-ASSISTED DETERMINATION OF MULTIPLE ROTATIONAL IRREGULARITIES IN AN INTERNAL COMBUSTION ENGINE

BACKGROUND AND SUMMARY OF THE INVENTION

The present subject matter relates to the computer-assisted determination of multiple rotational irregularities in an internal combustion engine. The internal combustion engine comprises a number of combustion chambers with moving pistons which are mechanically connected to one another via a crankshaft to set the crankshaft in rotation. The determination of the rotational irregularities is carried out using uneven running values which are determined according to a predefined calculation rule for measurement variables of the currently considered combustion chamber and measurement variables of the immediately previously igniting combustion chamber, continuously and successive for each combustion chamber in the logical sequence of the ignition of the combustion chambers while the internal combustion engine is operating, wherein a respective uneven running value represents a measure of the rotational irregularity of the crankshaft owing to the currently ignited combustion chamber.

In internal combustion engines, chemical energy is converted into mechanical work. For this purpose, an ignitable mixture composed of a fuel and air is burnt in the combustion chambers of a respective cylinder and generates combustion heat. The thermal expansion of the hot gas which is produced in this way is used to move the piston. Internal combustion engines which use this principle of internal combustion are gasoline engines and diesel engines. This principle is used in an analogous fashion in rotary engines.

An internal combustion engine, therefore, has a cycle during which a fuel/air mixture (in the case of a gasoline engine) or air (in the case of a diesel engine) is compressed in respect of combustion chamber. This cycle is the necessary preparation of participants in the combustion for the subsequent ignition. If the compression is disrupted, for example as result of mechanical defects in the internal combustion engine, satisfactory combustion cannot take place and therefore, a uniform generation of torque cannot occur.

Checking as to whether torque is generated uniformly is carried out using uneven running values that represent a measure of rotational irregularity of the crankshaft owing to differing generation of torque in the respective combustion chambers. The typical determination of the uneven running values is based on determination of the rotational speed of the crankshaft by means of a measurement by an encoder wheel. An encoder wheel, which is mechanically connected in a co-rotational fashion to the crankshaft, is for this purpose divided into geometric segments in order to assign a "torque" component to the combustion of each combustion chamber of the internal combustion engine. A respective combustion chamber is assigned a specific geometric segment as what is referred to as a measuring segment, which is sensed by a sensor system when the respective combustion chamber generates a torque.

Within the scope of sensing respective geometric segments, respective segment times are determined for all the combustion chambers by means of the encoder wheel, wherein the uneven running can be determined from the segment times by comparing the segment times of the combustion chambers with one another. The segment time is here that duration which a geometric segment assigned to a combustion chamber requires to move past the sensor. Since in a given calculation rule there is a relative dependence between the segment times of two combustion chambers which ignite logically one immediately after the other, the uneven running values of the combustion chambers which ignite logically immediately one after the other are influenced. The method of determining the uneven running values therefore permits simple faults which are caused on a singular basis by an individual combustion chamber to be reliably determined. Multiple rotational irregularities, however, cannot be robustly detected owing to the alternating influence of the uneven running values on one another.

This results in the problem that multiple rotational irregularities, i.e., faults which occur at the same time in a plurality of cylinders and which cause torque-generation, differing from the setpoint value of uneven running, which is determined by means of an encoder wheel, can be determined only if corresponding cylinders fire successively. As a result, faults cannot be localized satisfactorily or easily and, to a certain extent, costly and iterative troubleshooting attempts become necessary.

The object of the present subject matter specifies a method that permits multiple rotational irregularities in an internal combustion engine to be determined in a more reliable way.

A computer-assisted method is proposed for determining multiple rotational irregularities of an internal combustion engine of the generic type, which comprises a number of combustion chambers with moving pistons mechanically connected to one another via a crankshaft in order to set the crankshaft in rotation. The computer-assisted determination of multiple rotational irregularities is carried out using uneven running values. The uneven running values are determined according to a predefined calculation rule for measurement variables of the currently-considered combustion chamber and measurement variables of the immediately-previous-igniting combustion chamber. The uneven running values are determined continuously and successively for each combustion chamber in the logical sequence of the ignition of the combustion chambers while the internal combustion engine is operating. In this context, a respective uneven running value represents a measure of a rotational irregularity of the crankshaft due to the contribution of the currently-ignited combustion chamber.

The method comprises the step a) of determining the uneven running value of a currently ignited combustion chamber that is ignited in the logical sequence of the ignition of the combustion chambers immediately after a logically preceding combustion chamber, the uneven running value, which is determined for the preceding combustion chamber, has exceeded a specified threshold value, wherein the exceeding of the threshold value indicates a fault of the preceding combustion chamber. In step b), a compensation factor which models the influence of the running values of the currently ignited combustion chamber and those of the preceding combustion chamber on one another is determined. In step c), a compensated uneven running value of the currently ignited combustion chamber is determined from the uneven running value of the currently ignited combustion chamber and the compensation factor by means of an offset addition. Finally, in step d) the compensated uneven running value of the currently ignited combustion chamber is compared with the specified threshold value in order to determine whether the currently ignited combustion chamber has a fault or not.

The method according to the present subject matter is based on computational compensation of the uneven running values, which are dependent on one another, in order to be able to eliminate the influence of the uneven running values on one another by calculation. This means that the influence of an unevenly running combustion chamber is eliminated by calculation at the subsequently-igniting combustion chamber so that it becomes possible to detect only a particular combustion chamber's own respective uneven running, for each of the combustion chambers. This permits a robust diagnosis of multiple rotational irregularities, in particular, combustion chambers that ignite immediately logically one after the other and which have a fault. As a result, repairs to the internal combustion engine can occur more quickly since multiple rotational irregularities of the internal combustion engine can be readily and immediately localized. Furthermore, the validation of repairs is simplified. A further advantage consists in the fact that fewer warranty costs occur during servicing. In addition, there are fewer repeated repairs. A further advantage is that vehicle outage times become shorter.

One advantageous refinement provides that a respective uneven running value is determined from measured segment times of the currently ignited combustion chamber and the logically preceding ignited combustion chamber by means of an encoder wheel, which is connected in a co-rotational fashion to the crankshaft to determine a crankshaft rotational speed. In this context, a respective segment time is the duration the encoder wheel requires for the rotation of a specified angular segment assigned to a respective combustion chamber. The respective segment times are processed via a respective calculation rule to immediately determine an uneven running value of the currently ignited combustion chamber (also referred to as "measured combustion chamber" in this description).

The compensation factor is advantageously a proportional factor that theoretically results from the ratio of the segment time of the faulty combustion chamber with respect to the segment time of the same, non-faulty combustion chamber. Since the compensation factor for a combustion chamber that is currently being considered cannot be determined by measuring technology from the two specified segment times, because the combustion chamber either has a fault or does not have a fault, the compensation factor is determined indirectly.

The compensation factor is advantageously determined from a computationally determined segment time of the assumed non-faulty, preceding combustion chamber and an uneven running value difference value. The running difference value results from the difference between the measured uneven running value of the assumed, non-faulty, preceding combustion chamber and an uneven running value of the assumed, faulty, preceding combustion chamber, i.e., in other words, through the influence by the faulty, immediately-previously-igniting combustion chamber.

Almost all the indicated values and/or parameters can be determined by measuring technology or computationally immediately during the operation of the internal combustion engine. Therefore, the determination of the compensation factor can be carried out during the operational running time of the internal combustion engine.

It is furthermore advantageous, if to determine the compensated uneven running value from the compensation factor and the uneven running difference value that was previously determined for the preceding combustion chamber, an uneven running difference value for the (currently-ignited) combustion chamber is determined. To do so, the calculated uneven running difference value, as an offset, and the last measured uneven running value are added. As a result, the compensated uneven running value occurs as if the immediately-preceding-ignited combustion chamber did not have any faults.

The compensation factor is newly calculated for each pair of combustion chambers which immediately follow one another in the logical sequence of the ignition of the combustion chambers. As a result, it is possible to determine a compensated uneven running value for each combustion chamber.

It is also advantageous to determine the compensation factor, like the uneven running values, continuously during the running time of the operation of the internal combustion engine. In this way, it is possible to determine multiple rotational irregularities of the internal combustion engine in real time.

A computer program product which can be loaded directly into the internal memory of a digital computer and comprises software code sections with which the steps of the method described herein are executed when the product runs on the computer is also proposed. The computer can be, for example, an electronic control unit and/or other computing device of the vehicle. The computer can also be a vehicle-external computing unit, such as engine tester. The computer program product can be embodied on a non-transitory portable data carrier, e.g. a DVD, a CD-ROM or a USB memory stick.

The present subject matter is described in more detail below by means of an example embodiment and with reference to the drawings.

DETAILED DESCRIPTION OF THE DRAWINGS

Figure 4:
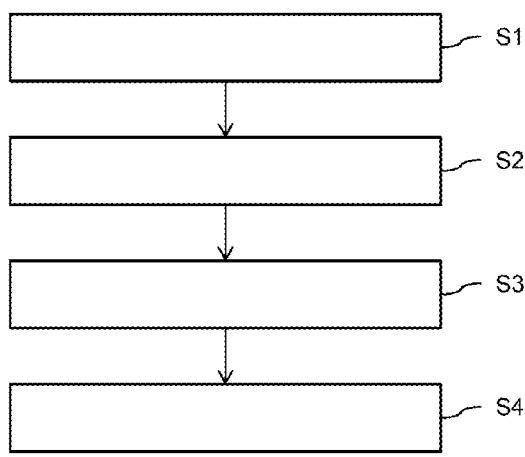
FIG. 4 is a flow diagram that illustrates the procedure of the method according to the present subject matter for the computer-assisted determination of multiple rotational irregularities.

FIG. 4 shows the basic flow diagram of the method according to the present subject matter for the computer-assisted determination of multiple rotational irregularities of two combustion chambers of an internal combustion engine which immediately follow one another in the logical sequence of the ignition. The method can be carried out independently of the number of combustion chambers, also referred to below as cylinders, of the internal combustion engine. The number of cylinders can be, for example, three, four, five, six, eight, ten or twelve. The method can be used in gasoline engines or in diesel engines. The method could also be applied to a rotary engine.

The method according to the present subject matter permits checking as to whether two cylinders that ignite immediately one after the other in a logical sequence generate a torque contribution which differs from an expected torque contribution. This could be the case, for example, owing to incorrect combustion, e.g., owing to later ignition of a fuel/air mixture. When compression is disrupted, correct combustion cannot take place, and therefore, there can be no uniform generation of torque by the internal combustion engine. Rotational irregularities can also be caused by mechanical defects, for example, in the case of faulty installation of a cylinder head seal, defects on piston rings or faulty installation of inlet valves or outlet valves during the production of the internal combustion engine. The consequences of faults of this type may be an unsteady engine speed, loud engine noise, reduced power output, and ignition misfires owing to the discontinuous compression and/or combustion.

The present method makes it possible to robustly locate combustion faults during which multiple rotation irregularities of cylinders occur, in which regularities can follow one another immediately in the logical sequence of the ignition. The method can be carried out, for example, at the final assembly of the internal combustion engine but also within the scope of maintenance in the workshop, and even in the normal driving mode.

The computer-assisted determination of multiple rotational irregularities of the internal combustion engine is based on the detection of fluctuations in the rotational speed (referred to as engine speed roughness) in the case of an absence of a combustion torque or a reduced combustion torque, wherein the fluctuations in the rotational speed are e.g., a consequence of differences in compression or filling.

In the following description, by way of example an internal combustion engine is assumed to be 4-cylinder internal combustion engine whose cylinders are fired in succession in a logical sequence in order to place a crankshaft of the internal combustion engine, which is connected to reciprocating pistons in the cylinders, in rotation.

In a first step S1 of the method according to the present subject matter, the uneven running values LUR of the number of cylinders are sensed during the rotation of the crankshaft of the internal combustion engine. The sensing of the uneven running values occurs here in the logical sequence of the ignition of the cylinders (referred to as ignition sequence IS) which is indicated in each of FIGS. 1 to 3 by Cyl[IS] on the first line. IS stands for the ignition sequence 0, 1, 2 or 3 of the 4-cylinder internal combustion engine, which is assumed as the example. The uneven running values LUR are sensed in by a control device of the internal combustion engine, referred to as the engine controller, to evaluate the rotational irregularity between the individual cylinders Cyl. The uneven running values LUR are used in the present method.

Robust sensing of the uneven running usually occurs in the quasi-steady-state operating mode, i.e., in an operating mode in which no or only minimum acceleration or deceleration of the crankshaft is required. The sensing of the uneven running values LUR occurs as described below.

The uneven running values LUR are sensed, for example, according to the formula $$LUR_n = \frac{t_n - t_{n-1} - t_c}{t_n^3}, \quad (1)$$

which is based on the fact that a fluctuation in the rotational speed which is proportional to the change in angular acceleration is caused by a fault in a cylinder, e.g., by a loss of compression. In formula (1), $t_n$ and $t_{n-1}$ denote what are referred to as segment times of a currently-ignited cylinder n as well as of the cylinder n−1 which is previously ignited logically immediately. The index n therefore denotes the number of the logical ignition sequence IS. In formula (1), $t_c$ is a constant time which is used for optional calibration. The uneven running value $LUR_n$ of the currently ignited (or measured) cylinder therefore correlates a current segment time $t_n$ of the currently ignited cylinder with the segment time $t_{n-1}$ of the previously ignited cylinder n−1. Therefore, relative increases in the time measurement can be sensed by means of the uneven running values LUR. If the internal combustion engine does not have any faults, the differences between the angular accelerations of the individual cylinders are virtually 0. This results in an uneven running value LUR of approximately 0, i.e. LUR≈0, depending on the selected compensation time.

If, on the other hand, a fault e.g. compression loss, is present e.g., at a cylinder with the ignition sequence IS=n−1, the segment time $t_{n-1}$ of said sequence is lengthened. This is perceptible in an increase in the uneven running value $LUR_{n-1}$, i.e. $LUR_{n-1} \gg 0$. If the uneven running value $LUR_{n-1}$ exceeds a specified threshold value SW1 (see FIGS. 1 to 3), this indicates the presence of a fault, e.g. a loss of compression and the like. The specified threshold value SW1 may have been determined, e.g., in advance by trials or numerical determination. Since the segment time $t_{n-1}$ is also input into the calculation of the logically following cylinder (IS=n), its uneven running value $LUR_n$ is less than 0, i.e. $LUR_n < 0$. However, the absolute uneven running value $LUR_n$ of the logically following cylinder (IS=n) cannot be used to obtain definitive information about the state of the cylinder n.

Figure 1:
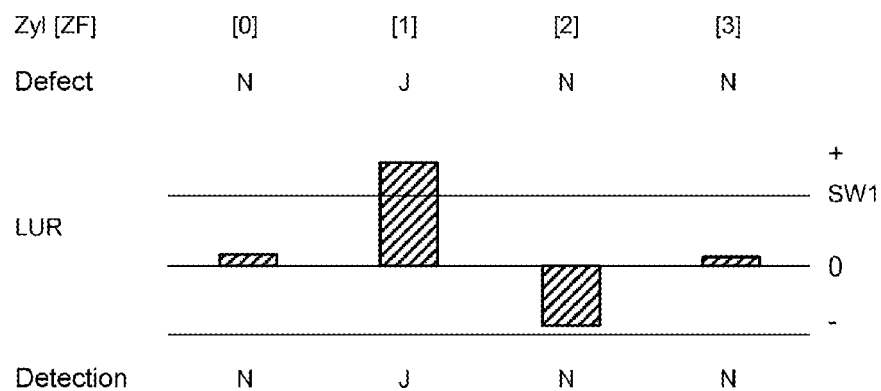
FIG. 1 shows a schematic illustration of non-compensated uneven running values of an internal combustion engine which has, for example, four combustion chambers, wherein one of the cylinders has a rotational irregularity.
Figure 2:
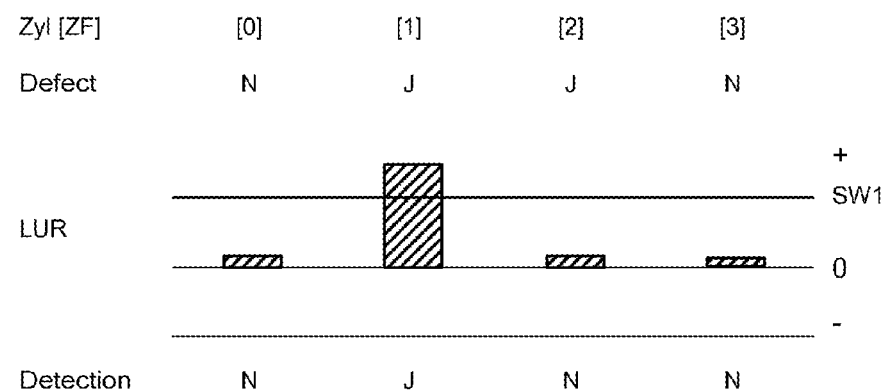
FIG. 2 shows a schematic illustration of non-compensated uneven running values of the internal combustion engine which has four combustion chambers, wherein two combustion chambers, which are ignited immediately one after the other in a logical ignition sequence, have a rotational irregularity.
Figure 3:
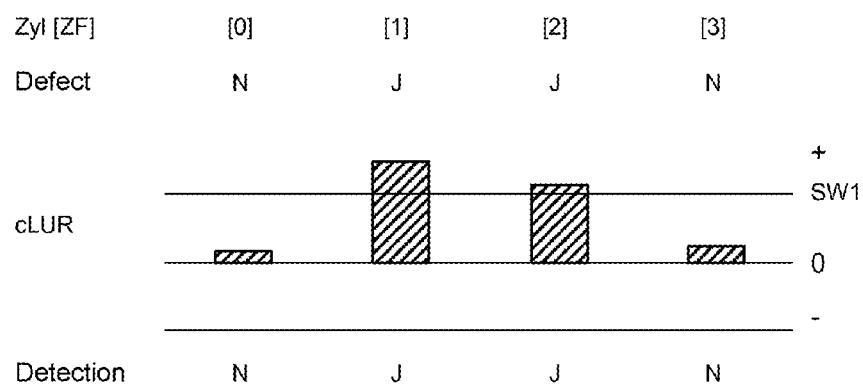
FIG. 3 shows a schematic illustration of uneven running values, compensated according to the present subject matter, of the internal combustion engine which has four combustion chambers, wherein two combustion chambers which are ignited immediately one after the other in a logical ignition sequence have a rotational irregularity.

This is illustrated once more with reference to FIGS. 1 and 2. As stated above, it results from the determination of the uneven running values LUR according to formula (1) that the cylinder which ignites immediately after a faulty cylinder in the logical sequence has a significantly lower, in particular a significantly negative, uneven running value. This is a consequence of the mutual influencing of the uneven running values of two cylinders igniting immediately one after the other in the logical sequence according to formula (1).

This can be detected, for example, in the illustration according to FIG. 1. In FIG. 1, non-compensated uneven running values LUR are illustrated for the 4-cylinder engine, assumed by way of example, in the logical ignition sequence Cyl[IS]. It is assumed here that the logically igniting sequence [1] has a defect (defect="J"), while the other cylinders of the ignition sequence IS=0, 2, 3 do not have a defect (defect="N"). The calculation of the uneven running values LUR is carried out according to formula (1) so that a significantly increased uneven running value LUR [1] is obtained owing to the relatively long segment time of the logical cylinder [1], which uneven running value LUR[1] exceeds the specified threshold value SW1. Due to the relatively long segment time $t_1$ for the logically igniting cylinder [1], there is a resulting significantly negative uneven running value LUR[2] for the cylinder [2] which ignites immediately thereafter. Only the cylinder [3] which ignites subsequent to this then in turn has a stable uneven running value LUR[3] close to 0.

It can be readily determined in a computer-assisted fashion on the basis of the knowledge of the determination of the uneven running values LUR that the logically igniting cylinder [1] has a fault.

FIG. 2 shows the case in which both the logically igniting cylinder [1] and the logical cylinder [2], which ignites immediately thereafter have a defect (defect="J"). Since the logically igniting cylinder [2] then also has an increased segment time $t_2$, an uneven running value LUR[2] which is increased in comparison with the case shown in FIG. 1 results, said running value being selected to be only, for example, virtually 0. Unambiguous detection of the fault at the logically igniting cylinder [2] is therefore not possible, since the absolute value of the uneven running value LUR[2] of the cylinder of ignition sequence [2] is not informative; since LUR[2]≈0 does not indicate a defect.

This procedure from the prior art therefore only permits reliable determination of rotational irregularity which is caused by a single faulty cylinder of the number of cylinders of the internal combustion engine. The described problem goes back to the relative comparative character of the detection method and should be solved with the above method in the direction of an absolute evaluation of individual cylinders.

The method according to the present subject matter expands this procedure with compensation in order also to be able to make a statement about the state of the cylinder which follows a faulty cylinder in the logical ignition sequence.

In the first step S1, that cylinder which is ignited immediately after a logically preceding cylinder in the logical sequence of the ignition of cylinders and whose uneven running value $LUR_{n-1}$, which is determined for the preceding cylinders has exceeded the specified threshold value SW1 (see FIGS. 1 to 3), is considered the currently-ignited cylinder. In other words, in the preceding example it was assumed that the cylinder of the ignition sequence $IS=_{n-1}$ has a fault which brings about a reduced generation of torque. In the example embodiment described above, the currently-igniting cylinder would be the cylinder of the ignition sequence [2] which is ignited after the logically preceding cylinder [1] which has a fault.

According to step S2, the determination of a compensation factor f is carried out that models the mutual influence of the uneven running value of the currently ignited cylinder (here [2]) and the preceding cylinder (i.e. of the cylinder which immediately precedes in the logical sequence of the ignition, here [1]). In step S3, a compensated and absolute uneven running value cLUR[2] (see FIG. 3) of the currently ignited cylinder (here: [2]) is then determined from the (not compensated and relative) uneven running value LUR[2] of the currently ignited cylinder and the compensation factor f Finally, in step S4, a comparison of the compensated and absolute uneven running value cLUR of the currently ignited cylinder (here: [2]) with the specified threshold value SW1 then takes place in order to determine whether the currently ignited cylinder (which ignites immediately a faulty, logically previously ignited cylinder) has a fault or not.

The determination of the compensation factor f will now be explained in detail.

In the case of a defect in the cylinder 1, the new segment time $t_1$* of the cylinder [1] is increased in comparison with a cylinder [1] which operates without faults, by the factor f which represents the searched-for compensation factor:

$$t_1^* = t_1^* f \qquad (2),$$

where the compensation factor f is greater than 1, i.e. f≥1. For the currently igniting cylinder [1] an uneven running value is then obtained as follows $$LUR_1 = \frac{t_1 - t_0 - t_c}{t_1^3},$$

if there is no defect present, and an uneven running value is obtained as follows $$LUR_1^* = \frac{f*t_1 - t_0 - t_c}{f^3 * t_1^3},$$

if a defect is present in the cylinder [1]. The superscript index * characterizes the presence of a defect. The difference caused by the defect in the values of the uneven running values $LUR_1$ and $LUR_1$* for the currently igniting cylinder [1] is referred to as an uneven running value difference value $\Delta LUR_1$ and is then obtained as $$\Delta LUR_1 = LUR_1 - LUR_1^* = \frac{1}{f^3} * \left( (f^3 - 1) * LUR_1 - \frac{f-1}{t_1^2} \right). \qquad (3)$$

For the following igniting cylinder [2] (which represents the subsequent cylinder), the following is obtained without any defect $$LUR_2 = \frac{t_2 - t_1 - t_c}{t_2^3},$$

and with a defect of the cylinder [1] the following is obtained $$LUR_2^* = \frac{t_2 - f*t_1 - t_c}{t_2^3}.$$

The uneven running difference value $\Delta LUR_2$ for the cylinder [2] is then obtained as $$\Delta LUR_2 = LUR_2 - LUR_2^* = (f-1) * \frac{t_1}{t_2^3}. \qquad (4)$$

In the event of there being no fault present, it can be assumed that all the segment times $t_1$, $t_2$ are approximately the same size and the uneven running value of the first cylinder [1] corresponds approximately to 0, i.e. $t_2 \approx t_1$ and $LUR_1 \approx 0$, since in the case of a cylinder which does not have a fault the uneven running value yields approximately 0 according to formula (1). This results in uneven running difference values $\Delta LUR_1$ for the first igniting cylinder [1] and $\Delta LUR_2$ for the following igniting cylinder [2] according to $$\Delta LUR_1 \approx -\frac{1}{f^3} * \frac{f-1}{t_1^2}, \qquad (5)$$

$$\Delta LUR_2 \approx \frac{f-1}{t_1^2}. \quad (6)$$

The relative change in the uneven running values between two cylinders which ignite immediately following one another in a logical sequence therefore arises as a result of the combination of the formulas (5) and (6) to form $$\frac{\Delta LUR_2}{\Delta LUR_1} \approx -f^3. \quad (7)$$

This results in the following for the second uneven running difference value $\Delta LUR_2$ $$\Delta LUR_2 \approx -f^3 * \Delta LUR_1.$$

An increased uneven running value of a cylinder therefore influences the following cylinder of the logical ignition sequence proportionally with the compensating influence of $-f^3$.

The determination of the compensation factor f is then as follows: the uneven running difference value $\Delta LUR_1$ of the cylinder [1] which has a fault can be determined by analyzing the measurements of the internal combustion engine, including the uneven running values when there is no fault present, and comparing with the present situation in which a fault is present. The segment time $t_1$ for the case in which no fault is present can be determined by means of the formula (8):

$$t_1 \approx \frac{\alpha_1}{6 + n_{mot}}, \quad (8)$$

where $t_1$ is the measured segment time of the igniting cylinder [1], $\alpha_1$ is a predefined segment width for detection of an ignition misfire and $n_{mot}$ is the average engine speed or crankshaft speed, in particular the average rotational speed for the present segment [1]. The compensation factor f can then be determined using the formulas (3) assuming LUR [1]≈0 without a defect and equation (8).

Therefore, the compensation factor f makes it possible to determine the uneven running difference values $\Delta LUR_n$ and $\Delta LUR_{n+1}$ for two cylinders which ignite logically one after the other, in accordance with the equation (7). As a result of the knowledge of the compensation factor f it is possible to determine a compensated uneven running value cLUR[2] for the cylinder [2] in that the uneven running difference value $\Delta LUR_2$ is added to the measured uneven running value $LUR_2$. This results in an uneven running value which is increased absolutely in comparison with FIG. 2 and in the case of a fault comes to rest above the specified threshold SW1 and therefore unambiguously indicates a fault. In contrast, if there is no fault present in the cylinder [2], the compensated uneven running value $cLUR_2$ becomes approximately 0, but will be significantly below the specified threshold value SW1. The compensated uneven running value $cLUR_2$ is then evaluated by comparing it with the specified threshold value SW1.

The method described above can be carried out during the running time of the internal combustion engine at the end of a production process of the internal combustion engine, within the scope of workshop testing or else in the driving mode. As a result of the method, there is no need to dismantle or partially dismantle the internal combustion engine before the extent of the fault can be understood.

The method can be carried out on the basis of existing control device functions in the internal combustion engine, since the detection of combustion misfires, which is legally required, can be used for this. This requires the evaluation of the rotational irregularity between individual cylinders, which corresponds to the determination of the uneven running values.

It is irrelevant which rotational-speed method is used to determine the uneven running values. A significant characterization of the method present here is to determine compensation of the sensed uneven running values and eliminate by calculation the influence of an unsteadily running cylinder at the cylinder which ignites next, given knowledge of a compensation value. As a result, the cylinder which ignites next can respectively detect its own proportion of the uneven running.

LIST OF REFERENCE SIGNS $LUR_{n-1}$, $LUR_n$ Uneven running values
LUR Non-compensated uneven running values
cLUR Compensated uneven running values
$\Delta LUR_{n-1}$, $\Delta LUR_n$ Uneven running difference values
SW1 Threshold value
f Compensation factor
S1 Determination of the relative uneven running values
S2 Determination of a compensation factor
S3 Determination of a compensated and absolute uneven running value
S4 Comparison of a compensated uneven running value
$t_{n-1}$, $t_n$, to Segment times

What is claimed is:

1. A method for computer-assisted determination of multiple rotational irregularities in an internal combustion engine comprising a plurality of combustion chambers with moving pistons mechanically connected to one another via a crankshaft in order to set the crankshaft in rotation, the method comprising:

measuring, using an encoder wheel and a sensor, a plurality of segment times of a currently-ignited combustion chamber and a logically-preceding ignited combustion chamber, wherein
the encoder wheel is connected in a co-rotational manner to the crankshaft and divided into a plurality of angular segments,
the sensor is configured to measure the plurality of segment times, and
a respective segment time is a duration the encoder wheel requires for rotation of a respective angular segment of a respective combustion chamber to move past the sensor;

determining, based on the plurality of segment times, an uneven running value of the currently-ignited combustion chamber that is ignited in a logical ignition sequence of the plurality of combustion chambers immediately after the logically-preceding ignited combustion chamber, wherein
an uneven running value determined for the logically-preceding ignited combustion chamber exceeds a specified threshold value and indicates a fault in the logically-preceding ignited combustion chamber;

determining a compensation factor that models an influence of the logically-preceding ignited combustion chamber on the uneven running value of the currently-ignited combustion chamber;

determining a compensated uneven running value of the currently-ignited combustion chamber from the uneven running value of the currently-ignited combustion chamber and the compensation factor; and comparing the compensated uneven running value of the currently-ignited combustion chamber with the specified threshold value to determine whether the currently-ignited combustion chamber has a fault, wherein the uneven running value is determined according to a predefined calculation rule for measurement variables of the currently-ignited combustion chamber and measurement variables of the logically-preceding ignited combustion chamber continuously and successively for each combustion chamber in the logical ignition sequence of the plurality of combustion chambers while the internal combustion engine is operating, a respective uneven running value represents a measure of the rotational irregularity of the crankshaft due to the currently-ignited combustion chamber, and the compensation factor is determined from:
- a computationally-determined segment time of an assumed non-faulty logically-preceding combustion chamber, and
- an uneven running difference value that results from the difference between:
  - a first uneven running value of the assumed, non-faulty logically-preceding combustion chamber, and
  - a second uneven running value of the assumed, faulty, logically-preceding combustion chamber.

2. The method according to claim 1, wherein
the compensation factor is a proportional factor that results from the ratio of the segment time of a combustion chamber when faulty to the segment time of the same combustion chamber when non-faulty.

3. The method according to claim 1, wherein
determining the compensated uneven running value from the compensation factor and the uneven running difference value, which was previously determined for the logically-preceding combustion chamber, further comprises:
determining an uneven running difference value for the combustion chamber, wherein
the uneven running difference value and the determined uneven running value are added.

4. The method according to claim 1, wherein
the compensation factor for each pair of combustion chambers that immediately follow one another in the logical ignition sequence of the plurality of combustion chambers is newly calculated.

5. A non-transitory computer-readable medium comprising instructions operable, when executed by one or more computing systems, to configure the one or more computing systems to perform the method of claim 1.

* * * * *